United States Patent
Russell et al.

(10) Patent No.: US 11,879,099 B1
(45) Date of Patent: Jan. 23, 2024

(54) METHOD FOR MAKING LIQUID HYDROCARBONS

(71) Applicant: UOP LLC, Des Plaines, IL (US)

(72) Inventors: Bradley Russell, Fall Branch, TN (US); Lin Jin, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 18/305,564

(22) Filed: Apr. 24, 2023

Related U.S. Application Data

(60) Provisional application No. 63/370,387, filed on Aug. 4, 2022.

(51) Int. Cl.
| | |
|---|---|
| *C10G 2/00* | (2006.01) |
| *C10J 3/72* | (2006.01) |
| *B01D 53/047* | (2006.01) |
| *B01D 53/22* | (2006.01) |

(52) U.S. Cl.
CPC ............ *C10G 2/30* (2013.01); *B01D 53/047* (2013.01); *B01D 53/229* (2013.01); *C10J 3/72* (2013.01); *C10G 2300/1011* (2013.01); *C10G 2300/4043* (2013.01); *C10G 2300/4081* (2013.01); *C10G 2400/08* (2013.01); *C10G 2400/26* (2013.01); *C10J 2300/1659* (2013.01)

(58) Field of Classification Search
CPC .. C10G 2/30; C10G 2400/08; C10G 2400/26; C10G 2300/1011; C10G 2300/4043; C10G 2300/4081; B01D 53/047; B01D 53/229; C10J 3/72
See application file for complete search history.

(56) References Cited

U.S. PATENT DOCUMENTS

| | | | |
|---|---|---|---|
| 6,179,900 B1 | 1/2001 | Behling et al. | |
| 9,062,257 B1 * | 6/2015 | Agee | C07C 1/04 |
| 10,272,381 B2 | 4/2019 | Saukaitis et al. | |
| 2013/0276630 A1 | 10/2013 | Te Braake et al. | |

FOREIGN PATENT DOCUMENTS

| | | |
|---|---|---|
| CN | 106800275 A | 6/2017 |
| JP | 2018517542 A | 7/2018 |
| WO | 2015134598 A1 | 9/2015 |

OTHER PUBLICATIONS

International Search Report from corresponding PCT application No. PCT/US2023/029113 dated Nov. 15, 2023.
Written Opinion from corresponding PCT application No. PCT/US2023/029113 dated Nov. 15, 2023.

* cited by examiner

*Primary Examiner* — Jafar F Parsa

(57) ABSTRACT

A Fischer-Tropsch (FT) process with a hybrid membrane/PSA configuration provides high component recoveries from FT off gas with minimum power consumption. Synthesis gas from a synthesis gas production zone is reacted in an FT reaction zone forming a liquid stream and an off gas stream. The off gas from the FT reaction zone, which contains hydrogen, carbon monoxide, and methane reactants, is recycled to the synthesis gas production zone. A purge stream from the recycle loop is sent to a membrane separation unit where it is separated into a permeate stream and a residue stream. The residue stream is separated in a pressure swing adsorption (PSA) unit into a fuel gas stream and a second stream. The second stream can be compressed and recycled to the synthesis gas production zone.

20 Claims, 1 Drawing Sheet

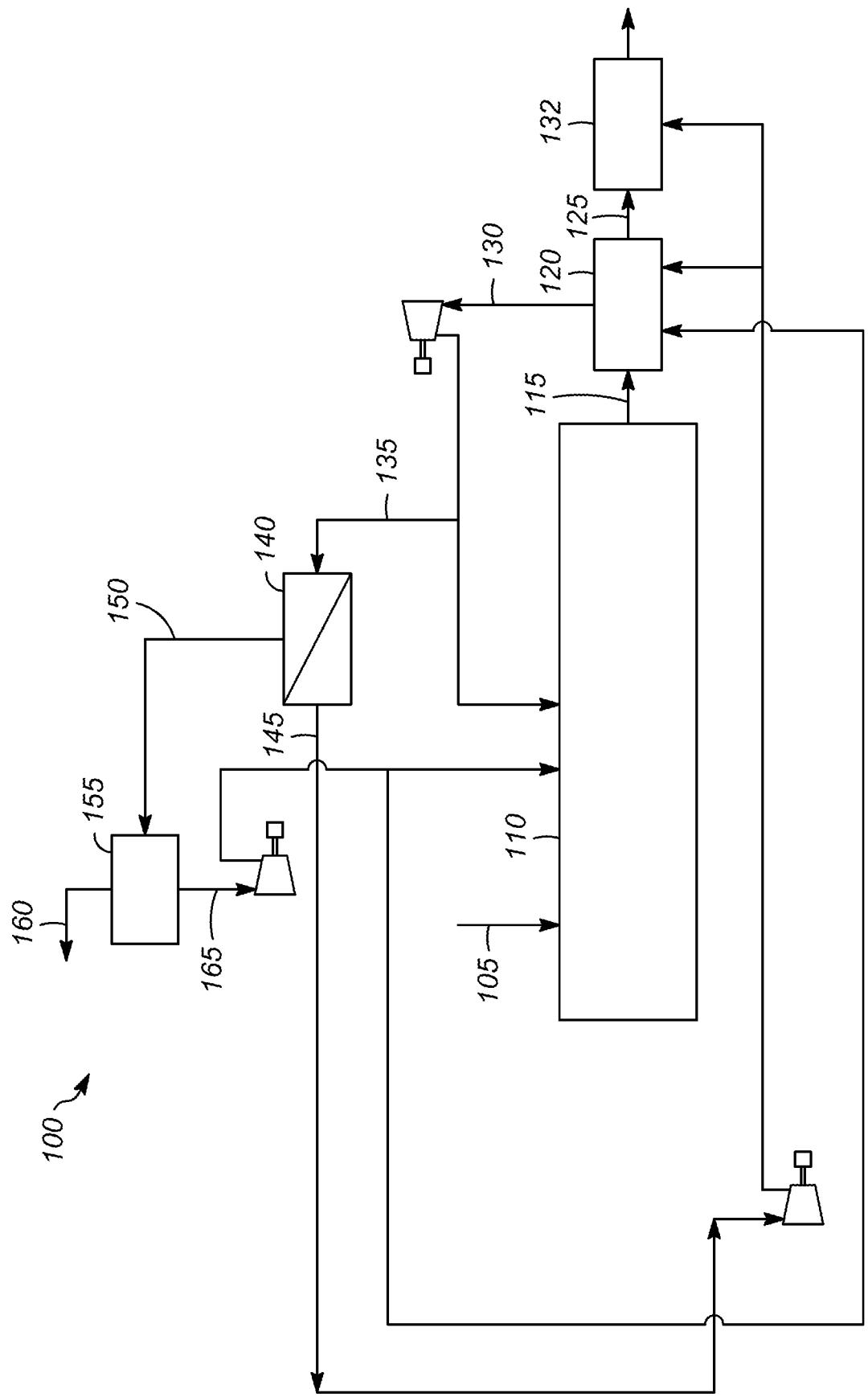

METHOD FOR MAKING LIQUID HYDROCARBONS

RELATED APPLICATIONS

This application claims priority to U.S. Provisional Patent Application Ser. No. 63/370,387 filed on Aug. 4, 2022, the entirety of which is incorporated herein by reference.

BACKGROUND

The Fischer-Tropsch (FT) process can be used to produce sustainable aviation fuel (SAF) and other liquid hydrocarbon fuels. The FT process converts synthesis gas to liquid hydrocarbons which can be upgraded to fuels, such as jet fuel in a fuel refining zone. The off gas from the FT reaction zone contains valuable hydrogen, carbon monoxide, and methane reactants, and it is recycled within the process to the synthesis gas production zone. However, the FT off gas also contains inert gases such as nitrogen and argon. The inert gases will build up in the process and must be purged from the system. The purge stream also comprises hydrogen and carbon-containing reactants (carbon monoxide and methane) and results in loss of valuable reactants to fuel and carbon emissions to the atmosphere.

Therefore, there is a need for a process to purge inert components efficiently and selectively from the FT process without undue loss of hydrogen and carbon-containing reactants to fuel gas and without increasing carbon emissions from the process.

BRIEF DESCRIPTION OF THE DRAWING

The FIGURE is an illustration of one embodiment of the process of the present invention.

DETAILED DESCRIPTION

The present invention relates to a Fischer-Tropsch (FT) process for producing sustainable aviation fuel (SAF) or other hydrocarbon liquid fuels from synthesis gas. The process includes a synthesis gas production zone where the synthesis gas is produced. The synthesis gas is reacted in an FT reaction zone comprising an FT reactor. The liquid stream from the FT reaction zone can be sent to a fuel refining zone for further processing into various fuel products such as jet fuel. The off gas from the FT reaction zone contains valuable hydrogen (molecular hydrogen), carbon monoxide, and methane reactants, and it is recycled within the process to the synthesis gas production zone. A purge stream is taken from the recycle loop in order to prevent the build-up of inert gases such as nitrogen and/or argon. An efficient recovery system for the purge stream was developed to recover hydrogen, methane, and carbon monoxide while selectively rejecting nitrogen to a fuel gas stream.

A hybrid membrane/pressure swing adsorption (PSA) configuration provides high component recoveries with minimum power consumption. A unique PSA design was developed for selective recovery of both methane and carbon monoxide relative to nitrogen from the membrane residue gas. The adsorbents include, but are not limited to, activated carbon and sodium Y zeolite. Other adsorbents can include activated alumina, silica gel, 5A zeolite, and 13X zeolite. For example, an activated carbon layer at the feed end of the bed (20 to 80 vol %) followed by a sodium Y zeolite (20 to 80 vol %) at the product end of the bed has been found to provide high methane and carbon monoxide recovery relative to nitrogen. This scheme retains the high $H_2$ recovery advantage of a membrane separation, while also providing high methane and carbon monoxide recovery in the PSA unit. Adsorbent split and PSA cycle parameters can be optimized for selective methane and carbon monoxide recovery relative to nitrogen.

Synthesis gas is produced in a synthesis gas production zone from a feed stream comprising hydrocarbons or a carbonaceous feedstock. Suitable feed streams include, but are not limited to, natural gas, liquified petroleum gas, naphtha, coal, biomass, and the like, or combinations thereof.

The synthesis gas production zone comprises a syngas reactor. Suitable syngas reactors include, but are not limited to, a steam reforming unit with an optional gas heated reformer, or an autothermal reforming unit with an optional gas heated reformer, or a gasification unit, or a partial oxidation (PDX) unit, dry reforming unit, or combinations thereof.

The composition of the synthesis gas may vary depending on the process used to produce it. For example, a typical synthesis gas composition (on a dry basis) from a biomass gasification unit may be 20 to 50 mol % carbon monoxide, 20 to 40 mol % molecular hydrogen, 0 to 10 mol % methane, 10 to 30 mol % carbon dioxide, 0 to 2 mol % nitrogen, and 0 to 0.5 mol % argon.

The synthesis gas production zone may also comprise at least one treatment zone. Syngas treatment units may be used to adjust the molar ratio of $H_2$:CO and/or to remove contaminants upstream of the FT reactor. Suitable treatments zones include, but are not limited to, water gas shift reactors, carbon dioxide recovery units, contaminant removal zones, or combinations thereof.

Carbon dioxide is recovered from the syngas (for sequestration) in a carbon dioxide recovery unit. Suitable carbon dioxide recovery units include, but are not limited to, amine separation units, cryogenic separation units, or carbon dioxide PSA units, or combinations thereof.

Suitable contaminant removal zones include, but are not limited to, sulfur removal zones. Suitable sulfur removal zones include, but are not limited to, hydrodesulfurization reactors, sulfur guard beds (e.g., a guard bed containing zinc oxide), or combinations thereof.

The molar ratio of $H_2$:CO in the synthesis gas from the syngas reactor is 80 adjusted in one or more of the treatment zones in the synthesis gas production zone so that the synthesis gas is appropriate for the FT reaction zone. The molar ratio of $H_2$:CO is in the range of 0.5 to 3.0, or 1.0 to 3.0, or 1.5 to 3.0, or 0.5 to 2.5, or 1.0 to 2.5, or 1.5 to 2.5, or 1.7 to 2.2.

The synthesis gas is converted to liquid hydrocarbons in the FT reactor. The hydrocarbon products derived from the Fischer-Tropsch reaction range from some methane to high molecular weight paraffinic waxes containing more than 50 carbon atoms. Numerous catalysts incorporating active metals, such as iron, cobalt, ruthenium, rhenium, etc. have been used in carrying out the reaction and both saturated and unsaturated hydrocarbons can be produced. The synthesis reaction is very exothermic and temperature sensitive whereby temperature control is required to maintain a desired hydrocarbon product selectivity. Suitable catalysts and reactions conditions can be selected by those of skill in the art.

The FT reaction zone produces a liquid hydrocarbon stream and an off gas stream. The liquid hydrocarbon stream can be sent to a fuel refining zone for 95 refining to produce various types of fuel, such as jet fuel. The fuel refining zone can include a hydroprocessing zone.

The FT off gas stream comprises hydrogen, carbon monoxide, methane, and inert gases such as nitrogen and/or argon. For example, the off gas stream may comprise 36 mol % hydrogen, 35 mol % carbon monoxide, 28 mol % methane, 0.4 mol % carbon dioxide, and 0.6 mol % nitrogen (on a dry basis). The temperature of the FT off gas stream may be 40 to 70° C., and the pressure may be 3 to 5 MPa (g). Most of the FT off gas stream is recycled to the synthesis gas production zone or to the FT reaction zone (or both) for conversion of residual methane, carbon monoxide, and hydrogen.

To prevent the build-up of inert gas in the recycle loop, a purge stream is 105 removed from the recycled off gas stream. It is sent to a membrane separation unit where it is separated into a permeate stream and a residue stream. The permeate stream contains hydrogen. For example, the permeate stream may comprise 82 mol % hydrogen, 12 mol % carbon monoxide, 5 mol % methane, 0.8 mol % carbon dioxide, and 0.15 mol % nitrogen. The temperature of the permeate stream may be 40 to 70° C., and the pressure may be 0.1 to 1.0 MPa (g). All or a portion of the permeate stream can be recycled to the FT reactor and/or the fuel refining zone. Alternatively, all or a portion of the permeate stream can be used elsewhere in the plant.

The residue stream comprises carbon monoxide, methane, and inert gas. For example, the residue stream may comprise 2 mol % hydrogen, 52 mol % carbon monoxide, 45 mol % methane, 0.2 mol % carbon dioxide, and 0.8 mol % nitrogen. The temperature of the residue stream may be 40 to 80° C. and 30 to 50° C. after cooling, and the pressure may be 3 to 5 MPa (g). The residue stream is separated in a pressure swing adsorption (PSA) unit into a fuel gas stream and a second stream.

The fuel gas stream comprises the inert gas and a first portion of the methane and the carbon monoxide. For example, the fuel gas stream may comprise 6 mol % hydrogen, 90 mol % carbon monoxide, 2 mol % methane, 0.0 mol % carbon dioxide, and 2 mol % nitrogen. The temperature of the fuel gas stream may be 30 to 50° C., and the pressure may be 3 to 5 MPa (g). The fuel gas stream can be recovered and used as fuel gas in various processes in the plant.

The second stream comprises a second portion of the methane and carbon monoxide. There is more carbon monoxide in the second stream than in the fuel gas stream. For example, the second stream may contain more than 50% of the carbon monoxide in the residue stream, or more than 60%, or more than 70%, or more than 80%. For example, the second stream may comprise 0.4 mol % hydrogen, 41 mol % carbon monoxide, 58 mol % methane, 0.2 mol % carbon dioxide, and 0.4 mol % nitrogen.

The temperature of the second stream may be 0 to 30° C., and the pressure may be 0.03 to 0.1 MPa (g). The second stream can be compressed and recycled to the synthesis gas production zone.

In some embodiments where oxygen is needed in the synthesis gas production zone, such as autothermal reforming, gasification, or partial oxidation, a water electrolyzer may be used to generate oxygen and hydrogen, desirably with renewable power. The oxygen can be used in the synthesis gas production zone, and the hydrogen can be used in the FT reaction zone and/or the fuel refining zone.

The process 100 is shown in the FIGURE. The feed stream 105 is introduced into the synthesis gas production zone 110. The synthesis gas production zone 110 can include one or more reactors, and can optionally include one or more treatment zones, as discussed above.

The effluent 115 from the synthesis gas production zone 110 is sent to the FT reaction zone 120. The FT process produces a liquid hydrocarbon stream 125 and an FT off gas stream 130. The liquid hydrocarbon stream 125 can be upgraded by refining in a fuel refining zone 132.

The FT off gas stream 130, which contains hydrogen, carbon monoxide, methane, and inert gas, can be recycled to the synthesis gas production zone 110.

A purge stream 135 is removed from the FT off gas stream 130 and sent to a membrane separation unit 140 where it is separated into a permeate stream 145 and a residue stream 150. The permeate stream 145, which comprises hydrogen, can be compressed and recycled to the FT reaction zone 120, or the fuel refining zone 132, or used elsewhere in the plant.

The residue stream 150, which contains carbon monoxide, methane, and inert gas is sent to a PSA unit 155 where it is separated into a fuel gas stream 160 and a second stream 165. The fuel gas stream 160, which comprises the inert gas and some carbon monoxide, is used as fuel gas. The second stream 165, which contains carbon monoxide and methane, is sent back to the synthesis gas production zone 110 or the FT reaction zone 120 or both.

EXAMPLE

A computer simulation was conducted for the process shown in the FIGURE. The syngas production zone included a gasification zone with biomass feedstock. A water electrolyzer was used to produce oxygen for the gasification reactor and hydrogen for the fuel refining zone and additional hydrogen for the FT reaction zone. A purge stream from the off gas recycle loop was first sent to a membrane unit for selective permeation of hydrogen. This hydrogen in the membrane permeate was combined with the electrolyzer product hydrogen and sent to the FT reaction zone and the fuel refining zone. The membrane residue gas was sent to a PSA unit for selective recovery of methane and carbon monoxide in the PSA tail gas. This tail gas stream was sent to the syngas production zone after compression. The inert gas (nitrogen) and a first portion of carbon monoxide was rejected in the high-pressure product stream from the PSA unit and sent to fuel.

Results of the process simulation are given in Table 1 below. Adding the PSA unit on the residue stream allows recovery of valuable methane and carbon monoxide reactants and avoids carbon emissions associated with burning these components in the fuel gas stream. Rather they are recycled in the system and ultimately converted to sustainable aviation fuel.

TABLE 1

|  | Membrane Only | Membrane + PSA |
|---|---|---|
| Hydrogen Recovery from Purge Stream, % | 97.7 | 98.2 |
| Methane Recovery from Purge Stream, % | 7.8 | 99.4 |
| Carbon Monoxide Recovery from Purge Stream, % | 14.8 | 70.4 |

SPECIFIC EMBODIMENTS

While the following is described in conjunction with specific embodiments, it will be understood that this description is intended to illustrate and not limit the scope of the preceding description and the appended claims.

A first embodiment of the invention is a process for making liquid hydrocarbons comprising introducing a feed stream comprising hydrocarbons or a carbonaceous feedstock to a synthesis gas production zone comprising a syngas reactor to produce a synthesis gas stream comprising synthesis gas having a molar ratio of hydrogen to carbon monoxide in a range of 0.5 to 3.0; reacting the synthesis gas stream in a Fischer-Tropsch (FT) reaction zone comprising an FT reactor to form a liquid hydrocarbon stream comprising the liquid hydrocarbon and an FT off gas stream comprising hydrogen, carbon monoxide, methane, and an inert gas; recycling a portion of the FT off gas stream to the synthesis gas production zone or to the FT reaction zone or to both the synthesis gas production zone and the FT reaction zone; removing a purge stream from the FT off gas stream; separating the purge stream in a membrane separation unit to form a permeate stream comprising hydrogen and a residue stream comprising the carbon monoxide, the methane, and the inert gas; separating the residue stream in a pressure swing adsorption (PSA) unit into a fuel gas stream comprising the inert gas and a first portion of the carbon monoxide and the methane and a second stream comprising a second portion of the carbon monoxide and the methane; introducing the second stream into the synthesis gas production zone or to the FT reaction zone or to both the synthesis gas production zone and the FT reaction zone. An embodiment of the invention is one, any or all of prior embodiments in this paragraph up through the first embodiment in this paragraph further comprising introducing the permeate stream into the FT reaction zone or a fuel refining zone or both the FT reaction zone or a fuel refining zone. An embodiment of the invention is one, any or all of prior embodiments in this paragraph up through the first embodiment in this paragraph wherein the syngas reactor comprises a steam reforming unit with an optional gas heated reformer, or an autothermal reforming unit with an optional gas heated reformer, or a gasification unit, or a partial oxidation (PDX) unit, or a dry reforming unit, or combinations thereof. An embodiment of the invention is one, any or all of prior embodiments in this paragraph up through the first embodiment in this paragraph wherein the synthesis gas production zone further comprises at least one treatment zone comprising a water gas shift reactor, a carbon dioxide recovery unit, a contaminant removal zone, or combinations thereof. An embodiment of the invention is one, any or all of prior embodiments in this paragraph up through the first embodiment in this paragraph wherein the carbon dioxide recovery unit comprises an amine separation unit, or a cryogenic separation unit, or a carbon dioxide PSA unit, or combinations thereof. An embodiment of the invention is one, any or all of prior embodiments in this paragraph up through the first embodiment in this paragraph wherein the contaminant removal zone comprises a sulfur removal zone. An embodiment of the invention is one, any or all of prior embodiments in this paragraph up through the first embodiment in this paragraph further comprising introducing an oxygen stream into the synthesis gas production zone. An embodiment of the invention is one, any or all of prior embodiments in this paragraph up through the first embodiment in this paragraph further comprising; electrolyzing water to form the oxygen stream and a hydrogen stream. An embodiment of the invention is one, any or all of prior embodiments in this paragraph up through the first embodiment in this paragraph wherein the inert gas comprises nitrogen, or argon, or both. An embodiment of the invention is one, any or all of prior embodiments in this paragraph up through the first embodiment in this paragraph wherein the second portion of the carbon monoxide is greater than the first portion of carbon monoxide. An embodiment of the invention is one, any or all of prior embodiments in this paragraph up through the first embodiment in this paragraph further comprising compressing the second stream before introducing the second stream into the synthesis gas production zone or the FT reaction zone or to both the synthesis gas production zone and the FT reaction zone. An embodiment of the invention is one, any or all of prior embodiments in this paragraph up through the first embodiment in this paragraph further comprising refining the liquid hydrocarbon stream in a fuel refining zone to produce jet fuel. An embodiment of the invention is one, any or all of prior embodiments in this paragraph up through the first embodiment in this paragraph wherein the fuel refining zone comprises a hydroprocessing zone. An embodiment of the invention is one, any or all of prior embodiments in this paragraph up through the first embodiment in this paragraph further comprising recovering the fuel gas stream.

A second embodiment of the invention is a process for making liquid hydrocarbons comprising introducing a feed stream comprising hydrocarbons or a carbonaceous feedstock to a synthesis gas production zone comprising a syngas reactor to produce a synthesis gas stream comprising synthesis gas having a molar ratio of hydrogen to carbon monoxide in a range of 0.5 to 3.0; reacting the synthesis gas stream in a Fischer-Tropsch (FT) reaction zone comprising an FT reactor to form a liquid hydrocarbon stream comprising the liquid hydrocarbon and an FT off gas stream comprising hydrogen, carbon monoxide, methane, and an inert gas; recycling a portion of the FT off gas stream to the synthesis gas production zone or to the FT reaction zone or to both the synthesis gas production zone and the FT reaction zone; removing a purge stream from the FT off gas stream; separating the purge stream in a membrane separation unit to form a permeate stream comprising hydrogen and a residue stream comprising the carbon monoxide, the methane, and the inert gas; separating the residue stream in a pressure swing adsorption (PSA) unit into a fuel gas stream comprising the inert gas and a first portion of the carbon monoxide and the methane and a second stream comprising a second portion of the carbon monoxide and the methane, wherein the second portion of the carbon monoxide is greater than the first portion of the carbon monoxide; introducing the second stream into the synthesis gas production zone or to the FT reaction zone or to both the synthesis gas production zone and the FT reaction zone; introducing the permeate stream into the FT reaction zone or a fuel refining zone or both the FT reaction zone or a fuel refining zone; recovering the fuel gas stream. An embodiment of the invention is one, any or all of prior embodiments in this paragraph up through the second embodiment in this paragraph wherein the syngas reactor comprises a steam reforming unit with an optional gas heated reformer, or an autothermal reforming unit with an optional gas heated reformer, or a gasification unit, or a partial oxidation (PDX) unit, or a dry reforming unit, or combinations thereof. An embodiment of the invention is one, any or all of prior embodiments in this paragraph up through the second embodiment in this paragraph wherein the synthesis gas production zone further comprises at least one treatment zone comprising a water gas shift reactor, a carbon dioxide recovery unit, a contaminant removal zone, or combinations thereof. An embodiment of the invention is one, any or all of prior embodiments in this paragraph up through the second embodiment in this paragraph wherein the inert gas comprises nitrogen, or argon, or both. An embodiment of the invention is one, any or all of prior embodiments in this paragraph up through the second embodiment in this paragraph wherein the second portion of the carbon monoxide is greater than the first portion of carbon monoxide. An embodiment of the invention is one, any or all of prior embodiments in this paragraph up through the second embodiment in this paragraph further comprising compressing the second stream before introducing the second stream into the synthesis gas production zone. Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A process for making liquid hydrocarbons comprising:
introducing a feed stream comprising hydrocarbons or a carbonaceous feedstock to a synthesis gas production zone comprising a syngas reactor to produce a synthesis gas stream comprising synthesis gas having a molar ratio of hydrogen to carbon monoxide in a range of 0.5 to 3.0;
reacting the synthesis gas stream in a Fischer-Tropsch (FT) reaction zone comprising an FT reactor to form a liquid hydrocarbon stream comprising the liquid hydrocarbon and an FT off gas stream comprising hydrogen, carbon monoxide, methane, and an inert gas;
recycling a portion of the FT off gas stream to the synthesis gas production zone or to the FT reaction zone or to both the synthesis gas production zone and the FT reaction zone;
removing a purge stream from the FT off gas stream;
separating the purge stream in a membrane separation unit to form a permeate stream comprising hydrogen and a residue stream comprising the carbon monoxide, the methane, and the inert gas;
separating the residue stream in a pressure swing adsorption (PSA) unit into a fuel gas stream comprising the inert gas and a first portion of the carbon monoxide and the methane and a second stream comprising a second portion of the carbon monoxide and the methane; and
introducing the second stream into the synthesis gas production zone or to the FT reaction zone or to both the synthesis gas production zone and the FT reaction zone.

2. The process of claim 1 further comprising:
introducing the permeate stream into the FT reaction zone or a fuel refining zone or both the FT reaction zone or a fuel refining zone.

3. The process of claim 1 wherein the syngas reactor comprises a steam reforming unit with an optional gas heated reformer, or an autothermal reforming unit with an optional gas heated reformer, or a gasification unit, or a partial oxidation (PDX) unit, or a dry reforming unit, or combinations thereof.

4. The process of claim 1 wherein the synthesis gas production zone further comprises at least one treatment zone comprising a water gas shift reactor, a carbon dioxide recovery unit, a contaminant removal zone, or combinations thereof.

5. The process of claim 4 wherein the carbon dioxide recovery unit comprises an amine separation unit, or a cryogenic separation unit, or a carbon dioxide PSA unit, or combinations thereof.

6. The process of claim 4 wherein the contaminant removal zone comprises a sulfur removal zone.

7. The process of claim 1 further comprising:
introducing an oxygen stream into the synthesis gas production zone.

8. The process of claim 7 further comprising;
electrolyzing water to form the oxygen stream and a hydrogen stream.

9. The process of claim 1 wherein the inert gas comprises nitrogen, or argon, or both.

10. The process of claim 1 wherein the second portion of the carbon monoxide is greater than the first portion of carbon monoxide.

11. The process of claim 1 further comprising:
compressing the second stream before introducing the second stream into the synthesis gas production zone or the FT reaction zone or to both the synthesis gas production zone and the FT reaction zone.

12. The process of claim 1 further comprising:
refining the liquid hydrocarbon stream in a fuel refining zone to produce jet fuel.

13. The process of claim 12 wherein the fuel refining zone comprises a hydroprocessing zone.

14. The process of claim 1 further comprising:
recovering the fuel gas stream.

15. A process for making liquid hydrocarbons comprising:
introducing a feed stream comprising hydrocarbons or a carbonaceous feedstock to a synthesis gas production zone comprising a syngas reactor to produce a synthesis gas stream comprising synthesis gas having a molar ratio of hydrogen to carbon monoxide in a range of 0.5 to 3.0;
reacting the synthesis gas stream in a Fischer-Tropsch (FT) reaction zone comprising an FT reactor to form a liquid hydrocarbon stream comprising the liquid hydrocarbon and an FT off gas stream comprising hydrogen, carbon monoxide, methane, and an inert gas;
recycling a portion of the FT off gas stream to the synthesis gas production zone or to the FT reaction zone or to both the synthesis gas production zone and the FT reaction zone;
removing a purge stream from the FT off gas stream;
separating the purge stream in a membrane separation unit to form a permeate stream comprising hydrogen and a residue stream comprising the carbon monoxide, the methane, and the inert gas;
separating the residue stream in a pressure swing adsorption (PSA) unit into a fuel gas stream comprising the inert gas and a first portion of the carbon monoxide and the methane and a second stream comprising a second portion of the carbon monoxide and the methane, wherein the second portion of the carbon monoxide is greater than the first portion of the carbon monoxide;
introducing the second stream into the synthesis gas production zone or to the FT reaction zone or to both the synthesis gas production zone and the FT reaction zone;

introducing the permeate stream into the FT reaction zone or a fuel refining zone, or both the FT reaction zone or a fuel refining zone; and recovering the fuel gas stream.

16. The process of claim 15 wherein the syngas reactor comprises a steam reforming unit with an optional gas heated reformer, or an autothermal reforming unit with an optional gas heated reformer, or a gasification unit, or a partial oxidation (PDX) unit, or a dry reforming unit, or combinations thereof.

17. The process of claim 15 wherein the synthesis gas production zone further comprises at least one treatment zone comprising a water gas shift reactor, a carbon dioxide recovery unit, a contaminant removal zone, or combinations thereof.

18. The process of claim 15 wherein the inert gas comprises nitrogen, or argon, or both.

19. The process of claim 15 wherein the second portion of the carbon monoxide is greater than the first portion of carbon monoxide.

20. The process of claim 15 further comprising:

compressing the second stream before introducing the second stream into the synthesis gas production zone.

\* \* \* \* \*